United States Patent [19]

Douty

[11] Patent Number: 4,487,529
[45] Date of Patent: Dec. 11, 1984

[54] GROUTING COMPOSITION AND METHOD OF USING SAME

[75] Inventor: Donald L. Douty, Murrysville, Pa.

[73] Assignee: United States Steel Corporation, Pittsburgh, Pa.

[21] Appl. No.: 337,567

[22] Filed: Jan. 7, 1982

[51] Int. Cl.³ .................... E21D 20/02; B65D 25/08
[52] U.S. Cl. ................... 405/261; 206/219; 106/90; 106/102; 405/260
[58] Field of Search ............ 405/260, 261; 206/219, 206/220; 106/90, 102

[56] References Cited

U.S. PATENT DOCUMENTS

| | | |
|---|---|---|
| 2,813,085 | 11/1957 | MacMullen et al. |
| 2,898,221 | 8/1959 | Carlson |
| 3,086,953 | 4/1963 | Nitzsche et al. |
| 3,190,762 | 6/1965 | Carlson et al. |
| 3,359,225 | 12/1967 | Weisend .................. 106/102 X |
| 3,423,219 | 1/1969 | Stone et al. .................. 106/102 X |
| 3,565,649 | 2/1971 | Stone et al. .................. 106/102 X |
| 3,623,895 | 11/1971 | Nitzsche et al. |
| 3,719,511 | 3/1973 | Bevard et al. |
| 3,751,275 | 8/1973 | Oken |
| 3,956,227 | 5/1976 | Foley et al. |
| 4,036,658 | 7/1977 | Puhringer et al. |
| 4,096,944 | 6/1978 | Simpson |
| 4,126,003 | 11/1978 | Tomic |
| 4,126,005 | 11/1978 | Coursen |
| 4,126,009 | 11/1978 | Tomic |
| 4,127,001 | 11/1978 | Tomic .................. 405/261 |
| 4,202,809 | 5/1980 | Eash |
| 4,247,224 | 1/1981 | Killmeyer |
| 4,326,890 | 4/1982 | Benichou .................. 206/219 |
| 4,338,048 | 7/1982 | Murphy et al. .................. 206/219 |

Primary Examiner—Dennis L. Taylor
Attorney, Agent, or Firm—W. Gary Goodson

[57] ABSTRACT

An improved hardenable inorganic grouting composition comprising (1) a dry inorganic cement powder, (2) liquid containing capsules, and wherein the liquid is reactive with the inorganic cement, and wherein the capsules are pressure sensitive and capable of being progressively ruptured by the force of the anchor element, and (3) a small amount of a lubricant in such form and amount to allow the cement powder and the capsules to flow as free flowing solids. This grouting composition is preferably in the form of a cartridge having an elongated tubular casing.

21 Claims, 1 Drawing Figure

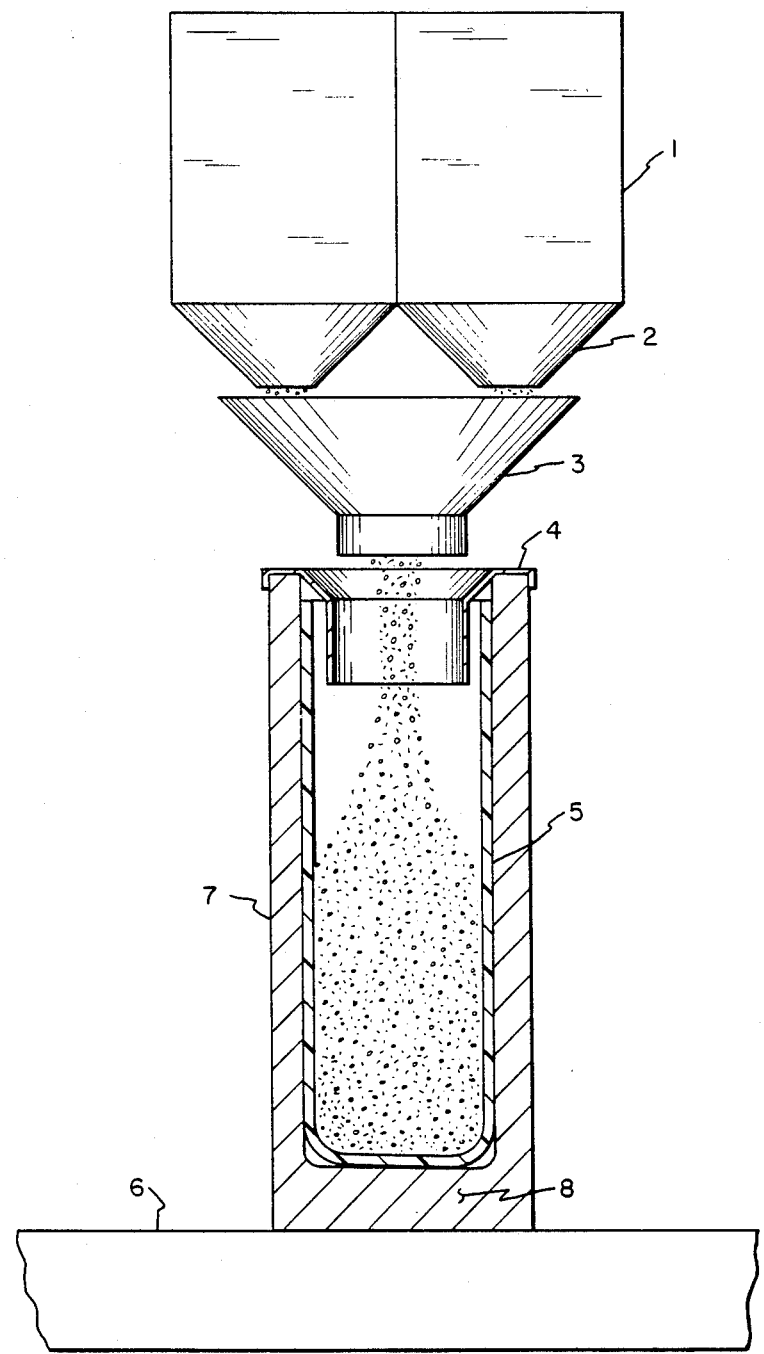

GROUTING COMPOSITION AND METHOD OF USING SAME

BACKGROUND OF THE INVENTION

1. Field of the Invention

This invention relates to an improved grouting composition for an anchor element, the composition comprising (1) pressure sensitive liquid containing microcapsule particles, and (2) non-pressure sensitive hydraulic cement powder particles. The grouting composition is desirably in the form of a cartridge comprising an elongated tubular casing.

2. Description of the Prior Art

Considerable effort has gone into developing means for anchoring roof bolts as part of an effort to prevent roof collapses in mines. Obviously, there are many other applications that require grouting of an anchor element in a hole of a support structure.

The common commercial anchor element cartridge in use today comprises reactive components of a resin with the components in separate compartments of an elongated tubular casing which are brought into contact with one another upon injecting a bolt, thereby forming a hardened resin which anchors the bolt into the base.

Since ventilation is often a serious problem in mines, the fumes that are given off by the reaction of the reactive components of the resin can cause serious health hazards to those people who have to work in the mines.

Therefore, efforts have been made to produce anchor element cartridges which would provide effective fastening for the anchor element in a hole of a support structure and not give off the harmful fumes. One such successful solution to this problem is disclosed in U.S. Pat. No. 4,096,944, incorporated herein by reference, wherein an anchor element cartridge is described comprising water-containing microcapsules which are pressure sensitive combined with non-pressure sensitive hydraulic cement powder. When an anchor element is injected into the elongated cartridge which is in an elongated bore hole in the roof of a mine, the pressure from the anchor element causes a reaction to take place between the hydraulic cement powder and the water which is released from the pressure sensitive microcapsules. These cartridges do an effective job of anchoring without the harmful fume problem of the resin cartridges.

However, one of the problems with the hydraulic cement cartridges is that the cost of manufacture using the conventional manufacturing equipment used for the resin cartridges produce a cartridge which is as expensive as the conventional resin cartridge. Efforts to solve this problem initially were not successful because in the attempt to mix and package the pressure sensitive microcapsules and the hydraulic cement powders the microcapsules would break, thereby causing pre-mature hardening of the cartridges.

A solution to this problem is proposed in co-pending U.S. patent application Ser. No. 337,657 filed on even date entitled, "Anchor for Manufacturing Anchor Element Cartridges" by Donald L. Douty. This co-pending application is incorporated herein by reference. The apparatus described therein provides a much higher production rate. However, difficulty was experienced in achieving the desired level of production. Also, difficulty as experienced in maintaining a uniform ratio of liquid-containing capsules to inorganic cement powder, particularly at the high production rates.

SUMMARY OF THE INVENTION

This invention relates to an improved hardenable inorganic grouting composition comprising (1) a dry inorganic cement powder, (2) liquid containing capsules, and wherein the liquid is reactive with the inorganic cement, and wherein the capsules are pressure sensitive and capable of being progressively ruptured by the force of the anchor element, and (3) a small amount of a lubricant in such form and amount to allow the cement powder and the capsules to flow as free flowing solids. This grouting composition is preferably in the form of a cartridge having an elongated tubular casing.

The grouting composition of this invention is injected into a hole in a support structure. An anchor element is then introduced into the hole containing the grouting composition. The grouting composition forms a hardened grout around the anchor element.

The lubricant may be an intimate admixture with the cement powder in the cartridge, or alternatively the lubricant may be combined with the liquid in the capsules in the cartridge.

The lubricant is preferably a silicone which is also a wetting agent for the cement powder.

The use of this invention has enabled even higher rates of production in the improved apparatus of the co-pending application cited above. Additionally, there is much improved control over the ratio of liquid-containing capsule to inorganic cement at these higher production rates. These higher production rates with substantially uniform good quality have meant a significant decrease in the cost of the final manufactured cartridge.

Additionally, however, it has unexpectedly been found that the time required for installation of anchor elements using the grouting composition of this invention can be dramatically reduced. The grouting composition containing the lubricant can produce much more compact cartridges. Besides saving on the material used in the elongated tubular casing, the shorter cartridges are easier to install due to greater dimensional stability and also due to the extra room provided for the anchor element in the hole of the support structure being anchored before pressure is applied. But, even more important for reducing installation time is the fact that the anchor element can be simply pushed in rather than screwed into the hole containing the cartridge. The grouting composition of this invention also seems to have an increased diffusion of liquid from the liquid-containing capsules to the inorganic cement powder. This allows a decrease in the proportion of liquid-containing capsules present in the grouting composition, thus resulting in significant savings, since this is the most expensive component of the grouting composition. Also, it is now possible to reduce the set-up time for the grouting composition, e.g. when the liquid is water, the set-up time can be reduced from 1 minute to 15 seconds. This amounts to a significant savings in time when multiplied by the thousands of anchor elements that might be installed, for example, in a coal mine in a single day. This means increased coal production in a coal mine for a given period of time.

The invention thus not only makes manufacture of cartridges more efficient and economical, but also improves and makes possible dramatic improvements in the efficiency of installation of anchor elements in support structures, such as those in coal mines. The net effect of all the aforementioned advantages is that the inorganic grouting composition of this invention has significant advantages over the resin-type grouting compositions with their well-known problems of toxicity and flammability. But even more important, these advantages are the type that should give the inorganic grouting compositions significant economic advantages over the resin-type grouting compositions.

BRIEF DESCRIPTION OF THE DRAWINGS

FIG. 1 is a schematic representation of a preferred apparatus for manufacturing cartridges containing the grouting composition of this invention.

DESCRIPTION OF THE PREFERRED EMBODIMENTS

The pressure sensitive capsule particles of this invention contain liquid and the non-pressure sensitive particles contain hydraulic cement powder. These are the principle ingredients of the filler for the cartridge of this invention. Chemicals for accelerating hardening may be added in amounts generally not exceeding about 3% of the weight of the cement powder. The hydraulic cement powder must be of the type that will harden when contacted with water or a similar liquid. Suitable types of hydraulic cement include portland, pozzolan, gypsum plaster, magnesium oxychloride and magnesium oxysulfate. The cement is generally used without any filler such as sand in order to form a stronger, faster hardening material.

The capsules containing the liquid are preferably spherical in shape. However, they may be elongated, threadlike, etc. They comprise an outer shell of an insoluble, frangible material which is pressure sensitive and which contains a small amount of liquid. The capsules are preferably microcapsules varying in size from about 400 to about 5000 microns in diameter. The most preferred diameter of such microcapsules is between about 1000 and about 1700 microns. The capsules serve to keep the liquid separate from the cement powder until the capsules are broken by application of pressure.

The liquid used in the capsules is preferably water or other liquid that will react with hydraulic cement to form a hardened mass capable of fastening an anchor element in a hole of a support structure. Preferably, the hardened mass is such that would be suitable for roof bolts in mines such as coal mines.

The lubricant component of the grouting composition of this invention is in such form and amount to allow the inorganic cement powder to flow as free flowing solids. Preferably, this lubricant is also a wetting agent for the cement powder. A silicone lubricant is particularly preferred. Most preferred is a silicone fluid having a viscosity between about 300 cps and about 10,000 cps.

FIG. 1 of this invention discloses a preferred apparatus for manufacturing cartridges using the grouting composition of this invention, comprising a double hopper arrangement 1, preferably containing a separate auger feed in each hopper, wherein one of the hoppers is for the pressure sensitive containing microcapsule particles and the other hopper is for the non-pressure sensitive hydraulic cement particles. The double hopper 1 comprises means for transporting the particles from each hopper into a common receptacle in the form of a funnel-shaped bottom of the hopper 2. The common receptacle means 3 is preferably in the form of a funnel and comprises means for mixing the particles without causing rupture of a substantial portion of the pressure sensitive liquid-containing particles. This means for mixing can be the inclined sides of the funnel or, preferably, rotating horizontal discs with each disc being located under the point where the different particles come to the common receptacle means 3. The mixing means can also be blasts of air or other gaseous material, or other such means. The mixed particles then drop into filling means 4, preferably in the form of a funnel, for filling a first vertically elongated flexible tubular casing 5. The apparatus also contains means for positioning the tubular casing 5 in filling position relative to the filling means 4. This means for positioning can also include a vibrating means for vibrating the tubular casing during the filling step to consistently produce a packed tubular casing having mixed particles of an effective uniformity of density for use in fastening an anchor element in a hole in a support structure. The means for positioning and vibrating means may include a movable support 6 to move the tubular casing into position in a vertically elongated rigid frame 7, which preferably is in the form of a rigid tube with a closed bottom 8. The elongated tubular casing 5 also preferably has a closed bottom. This casing is preferably made of plastic film such as polyolefin which is inexpensive and easily ruptured by insertion of the anchor element.

The bottom of the filling means 4 is preferably attached to the top of the tubular casing 5 and the bottom of the tubular casing 5 rests on a support means such as movable support 6 or the bottom 8 of the vertically elongated rigid frame 7.

The movable support means 6, when vibrating during the filling operation, then transfers its vibrations to the vertically elongated tubular casing during the filling operation to obtain the desired end product. This apparatus is thus able to produce a high-quality product very rapidly. It also lends itself well to automation, the use of multiple filling arrangements for the elongated casings.

EXAMPLE

Using the apparatus of Fig. 1, two parts by weight of the hydraulic cement particles (of alpha-type gypsum cement having an average particle size of 0.074 mm or 0.0017 inches) are mixed with one part of water-containing microcapsules having an average water payload of 0.625 percent and an average diameter of 1700 microns and wherein the capsules are made according to the method for mass producing capsules outlined in U.S. Pat. No. 3,389,194, incorporated herein by reference. High-quality cartridges are produced according to this method at a production rate of twenty (two-foot equivalent length, 24 inches actual length, and 0.95 inches diameter) cartridges per minute with a dispensing accuracy of ±2 grams or 1.3 percent. This compares to the prior art Chub-style machine and independent vibrator system production rate of 8 cartridges per minute with a dispensing tolerance of ±7 grams or 4.7 percent.

A cement-enhancing silicone fluid having a viscosity of 350 cps and sold under the trade name Dow Corning 200 Fluid, and more fully described in the co-pending U.S. patent application Ser. No. 337,657, filed on even date, entitled "Improved Grouting Composition and Method of Using Same" by Donald L. Douty, lubricates the cement particles and gives greater compaction of the cement and water microcapsule mixture. The amount of water microcapsules is reduced by about 8%. The two-foot equivalent length cartridge of additive-enhanced cement is 20.5 inches long which gives distinct advantages in reducing packaging costs (less plastic sleeve material and shorter boxes), lowering bolt installing costs (faster), and increasing bolting machine safety (a straight-push, constant force, and no-turn installing).

The cartridges which contain the silicone additive have a set-up time of 15 seconds from the time that the capsules are broken by pressure until the grouting composition is significantly hardened. This compares to a set-up time of about 1 minute for resin-based cartridges and about 35 seconds for the inorganic cement cartridges described above, except without the silicone additive. In a typical coal mine this equates to an increase in coal production of 15 to 20 percent for the silicone additive cement cartridge over the resin cartridge. This savings in time obviously means a significant increase in coal production with very little increase in cost of overhead. Thus, the profitability of a coal mine can be significantly improved using the improvement of this invention.

When filling the tubular casing with the mixed ingredients of this invention using the apparatus of FIG. 1, it is preferred to vibrate the casing at a rate such that little product separation takes place, the cartridges are firm and easily handled, and localized hardening is avoided. Also, it is important that the tubular casing has a soft bottom so that rupture of the water capsules is avoided during the filling and vibrating step. Higher percentages of silicone additive in the cement also slightly shortened the vibration time period. Excessive vibration during filling caused local hardening in the cartridge whereas, for example, this local hardening was eliminated by vibrating the tubular casing during filling at 250 cycles per minute for 35 seconds while replacing the metal clip at the bottom of the casing with a heat seal to provide a softer bottom of the cartridge.

A preferred mixture for the cartridge of this invention in one series of tests was determined to contain 1.5 percent (by weight) silicone and 1.5 percent potassium sulfate (accelerator) mixed at 0.29 water microcapsule to cement weight ratio based upon the shortest hardening time when inserting the anchor element and the best workability of any mix tested.

Pull tests of roof bolts installed in coal mine roofs using cement/water microcapsule cartridges produced using the apparatus of FIG. 1 and in accordance with the teachings of this invention, showed that the hardened grout containing the silicone additive had greater pull strength compared to otherwise similar hardened grout which did not contain the silicone additive.

I claim:

1. A method of fastening an anchor element in a hole in a support structure comprising
   (a) delivering a hardenable inorganic grouting composition into the hole, said grouting composition comprising (1) a dry inorganic cement powder, (2) liquid containing capsules, and wherein said liquid is reactive with said inorganic cement and wherein said capsules are pressure sensitive and capable of being progressively ruptured by the force of said anchor element, and (3) a small amount of a lubricant in such form and amount to allow said cement powder and said capsules to flow as free flowing solids; and
   (b) introducing an anchor element into said grouting composition in said hole before any substantial hardening of said composition has occurred, whereby said grouting composition is forced into an annulus formed between said anchor element and the wall of said hole, said inorganic grouting composition reacts rapidly around said anchor element to form a hardened grout of sufficient strength to firmly anchor said support structure.

2. Method as in claim 1 wherein said composition delivered into said hole is in a frangible elongated tubular casing, said casing is penetrated and broken by said anchor element, and said capsules are ruptured by said anchor element.

3. Method as in claim 2 wherein said composition comprises a substantially homogeneous mixture of said inorganic cement powder and said capsules.

4. Method as in claim 3 wherein said liquid is water, said cement powder is hydraulic cement powder and said lubricant is a silicone which is also a wetting agent for said cement powder.

5. Method as in claim 4 wherein said lubricant is in intimate mixture with said cement powder.

6. Method as in claim 4 wherein said lubricant is encapsulated with said liquid.

7. In a grouting system for use in an elongated hole of a support structure in combination with an anchor element wherein a hardened grout is formed around the reinforcing member in the hole by the reaction of at least two mixed components of a hardenable inorganic grouting composition, thereby anchoring the reinforcing member in the hole, said components being adapted to be forced into an annulus formed between said anchor element and the wall of said hole by the introduction of said reinforcing member into said composition before any substantial hardening of said composition has occurred, and comprising an inorganic grouting composition comprising (1) a dry inorganic cement powder and (2) liquid containing capsules, and wherein said liquid is reactive with said inorganic cement, and wherein said capsules are pressure sensitive and capable of being progressively ruptured by the force of said anchor element, the improvement wherein said composition additionally comprises a small amount of a lubricant in such form and amount to allow said cement powder and said capsules to flow as free flowing solids.

8. A grouting system as in claim 7 wherein said composition comprises a substantially homogeneous mixture of said inorganic cement powder and said capsules.

9. A grouting system as in claim 8 wherein said composition is contained in an elongated tubular casing capable of being punctured and shredded by said anchor element thrust into said cartridge.

10. A grouting system as in claim 9 wherein said lubricant is in intimate mixture with said cement powder.

11. A grouting system as in claim 9 wherein said lubricant is encapsulated with said liquid.

12. A grouting system as in claim 7 wherein said liquid is water and wherein said lubricant is also a wetting agent for said cement powder.

13. A cartridge for grouting an anchor element in an elongated hole of a support structure, comprising (1) an elongated tubular casing fabricated of a frangible material capable of being punctured and shredded by an anchor element thrust into said cartridge and having a diameter between enclosed ends sufficient to enable said cartridge to be introduced into said hole, and (2) a substantially homogeneous mixture of (1) a dry hydraulic cement powder, (b) watercontaining capsules substantially uniformly dispersed in said cement powder that fills the interior of said tubular casing between said enclosed ends, and (c) a silicone lubricant which also acts as a wetting agent for said cement powder; and said capsules have inert, frangible shells enclosing droplets of water that are pressure sensitive and are capable of being progressively ruptured by the force of said anchor element being thrust into said cartridge when said cartridge is positioned in said hole to thereby dispense the water substantially uniformly throughout said cement powder to enable said water and said cement powder to thoroughly interact to form a flowable cement paste in contact with the hole wall and said anchor element, which when solidified forms a grout about said anchor element to secure said anchor element to said support structure.

14. A grouting cartridge as defined in claim 13 wherein said capsules have diameters in a range of between about 400 and about 5000 microns.

15. A grouting cartridge as defined in claim 13 wherein said mixture comprises 1 part water to between about 3 and about 5 parts of said cement powder by weight.

16. A grouting cartridge as defined in claim 13 wherein said mixture comprises one part water to about 4 parts gypsum cement powder by weight.

17. A grouting cartridge as defined in claim 13 wherein said capsules are sufficiently frangible to be ruptured en masse upon the application of a pressure of between 10 and 600 grams force.

18. A grouting cartridge as defined in claim 13 wherein said capsules contain an aqueous solution of a chemical accelerator for accelerating the hardening of said cement powder when said capsules are ruptured.

19. A grouting cartridge as in claim 13 wherein said silicone is in intimate mixture with said cement powder.

20. A grouting cartridge as in claim 19 wherein said silicone is a silicone fluid having a viscosity between about 300 cps and about 10,000 cps.

21. A grouting cartridge as in claim 13 wherein said cement powder is Portland cement powder.

* * * * *